US012589536B2

(12) United States Patent
Kamata

(10) Patent No.: US 12,589,536 B2
(45) Date of Patent: Mar. 31, 2026

(54) DIE CASTING DEVICE AND MOLDING METHOD

(71) Applicant: TOYOTA JIDOSHA KABUSHIKI KAISHA, Toyota (JP)

(72) Inventor: Hiroshi Kamata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 18/645,659

(22) Filed: Apr. 25, 2024

(65) Prior Publication Data

US 2025/0050564 A1     Feb. 13, 2025

(30) Foreign Application Priority Data

Aug. 9, 2023     (JP) ................................. 2023-130489

(51) Int. Cl.
| | |
|---|---|
| *B29C 45/40* | (2006.01) |
| *B22D 17/22* | (2006.01) |
| *B29C 45/26* | (2006.01) |
| *B29K 105/12* | (2006.01) |

(52) U.S. Cl.
CPC ...... *B29C 45/4005* (2013.01); *B22D 17/2236* (2013.01); *B29C 45/26* (2013.01); *B29K 2105/12* (2013.01)

(58) Field of Classification Search
CPC .......... B29C 45/4005; B29C 2045/336; B29C 2045/445; B29C 33/444; B29D 17/2236
See application file for complete search history.

(56) References Cited

FOREIGN PATENT DOCUMENTS

| | | | | | |
|---|---|---|---|---|---|
| CN | 116037893 | A | * | 5/2023 | ......... B22D 17/2236 |
| JP | H05-329893 | A | | 12/1993 | |
| JP | 2012-200777 | A | | 10/2012 | |
| JP | 2016068090 | A | * | 5/2016 | |

* cited by examiner

*Primary Examiner* — Virak Nguon
(74) *Attorney, Agent, or Firm* — SoraIP, Inc.

(57) ABSTRACT

A cam mechanism allows a slide ejector plate and slide ejector pins to move relative to a slide core as the slide core moves. Alternatively, the cam mechanism allows the slide ejector plate and the slide ejector pins to move with the slide core. This eliminates the need for a dedicated hydraulic cylinder for moving the slide ejector plate and the slide ejector pins. The number of parts of the die casting device can thus be reduced.

3 Claims, 6 Drawing Sheets

DIE CASTING DEVICE AND MOLDING METHOD

CROSS-REFERENCE TO RELATED APPLICATION

This application claims priority to Japanese Patent Application No. 2023-130489 filed on Aug. 9, 2023, incorporated herein by reference in its entirety.

BACKGROUND

1. Technical Field

The present disclosure relates to die casting devices and molding methods.

2. Description of Related Art

Japanese Unexamined Patent Application Publication No. 2012-200777 (JP 2012-200777 A) discloses a technique related to a die casting device. In this related art, in the step of opening a mold, a molded article is released from the mold by ejecting a molded article by an ejection mechanism while moving a movable mold in a direction away from a fixed mold.

However, the above related art requires a separate mechanism for ejecting a molded article in addition to a mechanism for moving the movable mold. This results in an increased number of parts of the device.

SUMMARY

In view of the above circumstances, it is an object of the present disclosure to provide a die casting device and molding method that can reducing the number of parts.

A die casting device according to an aspect of the present disclosure includes:

a fixed mold that is a part of a mold;

a movable mold that is another part of the mold, that is configured to be brought into contact with and separated from the fixed mold, and that together with the fixed mold forms a cavity when the movable mold is brought into contact with the fixed mold to allow a molded article to be formed in the cavity;

a slide core that is provided on the movable mold, that is movable in a direction intersecting with a direction in which the movable mold is moved, and that together with the fixed mold and the movable mold forms the molded article; and a cam mechanism that allows an ejector member to move relative to the slide core as the slide core moves or that allows the ejector member to move with the slide core, the ejector member being configured to release the molded article from the slide core.

The die casting device according to the above aspect of the present disclosure includes the fixed mold, the movable mold, the slide core, and the cam mechanism. The fixed mold and the movable mold form at least part of the mold. The movable mold is configured to be brought into contact with and separated from the fixed mold. The movable mold together with the fixed mold forms the cavity when the movable mold is brought into contact with the fixed mold. The molded article is formed in the cavity. The slide core is provided on the movable mold, and is movable in a direction intersecting with the direction in which the movable mold is moved. The slide core together with the fixed mold and the movable mold forms the molded article. That is, in the present disclosure, the cavity is formed by the fixed mold, the movable mold, and the slide core. The molded article is formed in the cavity.

The slide core is movable in a direction intersecting with the direction in which the movable mold is moved. The cam mechanism allows the ejector member to move relative to the slide core as the slide core moves, the ejector member being configured to release the molded article from the slide core. Alternatively, the cam mechanism allows the ejector member to move with the slide core.

Typically, after a mold is opened by moving a movable mold with respect to a fixed mold, a molded article held by the movable mold and a slide core is removed from the mold by releasing the molded article from the slide core and then from the movable mold. In the present disclosure, the cam mechanism is used to release the molded article from the slide core. When releasing the molded article from the slide core by the cam mechanism, the molded article is ejected by the ejector member.

For example, the ejector member is an ejector plate provided in the slide core and including a plurality of ejector pins. This ejector plate is movable in a direction in which the slide core is moved. When the ejector plate is moved, the distal end faces of the elector pins protrude from the surface of the slide core, so that the molded article is released from the slide core. That is, the ejector member moves relative to the slide core. When releasing the molded article from the movable mold, it is necessary to withdraw the slide core from a movement trajectory of the molded article in advance. At this time, it is necessary to move the ejector member with the slide core.

Typically, a dedicated hydraulic cylinder is used to move the ejector member. According to the present disclosure, on the other hand, the cam mechanism allows the ejector member to move relative to the slide core as the slide core moves, or allows the ejector member to move with the slide core. In other words, the present disclosure does not require a dedicated hydraulic cylinder for the ejector member in order to move the ejector member. It is therefore possible to reduce the number of parts of the die casting device.

In the die casting device according to the above aspect of the present disclosure, the cam mechanism may include a cam slot provided in the slide core, and a lock pin that is movable via a tracing portion inserted in the cam slot, that is engaged with the ejector member and is engageable with an engaged portion of the movable mold, and that allows the ejector member to move relative to the slide core when engaged with the engaged portion, and allows the ejector member to move with the slide core when disengaged from the engaged portion.

In the die casting device with the above configuration, the cam mechanism includes the cam slot and the lock pin. The cam slot is provided in the slide core. The lock pin is provided with the tracing portion. The tracing portion is inserted in the cam slot. The lock pin moves along the shape of the cam slot via the tracing portion.

The lock pin is engaged with the ejector member, and is engageable with the engaged portion of the movable mold. When the lock pin is engaged with the engaged portion of the movable mold, the ejector member is fixed to the movable mold via the lock pin. When the slide core slides in this state, the ejector member is movable relative to the slide core. That is, the molded article can be released from the slide core.

On the other hand, when the lock pin is disengaged from the engaged portion, the ejector member is movable with the slide core. The ejector member can thus be withdrawn (moved) with the slide core from the movement trajectory of the molded article before the molded article is released from the movable mold.

As described above, with the simple configuration, the ejector member can be moved relative to the slide core as the slide core moves, or the ejector member can be moved with the slide core. According to the present disclosure, this configuration can be implemented at low cost.

A molding method according to another aspect of the present disclosure is a molding method using the die casting device according to the above aspect. The molding method includes:

a mold clamping step of bringing the movable mold into contact with the fixed mold;

a molding step of forming a molded article by filling the cavity with a molten material and cooling the molten material;

a mold opening step of moving the movable mold and the slide core in a direction away from the fixed mold;

a slide core releasing step of allowing the ejector member to move relative to the slide core via the cam mechanism and moving the slide core with respect to the movable mold to release the molded article from the slide core;

a slide core moving step of moving the ejector member with the slide core via the cam mechanism in a direction away from the molded article; and a movable mold releasing step of releasing the molded article from the movable mold.

The molding method according to the above aspect of the present disclosure includes the mold clamping step, the molding step, the mold opening step, the slide core releasing step, the slide core moving step, and the movable mold releasing step. First, in the mold clamping step, the movable mold is brought into contact with the fixed mold to clamp the mold. Next, in the molding step, the cavity formed by the fixed mold, the movable mold, and the slide core is filled with the molten material, and the molten material is cooled to form the molded article. In the mold opening step, the movable mold and the slide core are then moved in the direction away from the fixed mold. The mold is thus opened.

Thereafter, in the slide core releasing step, the ejector member is allowed to move relative to the slide core via the cam mechanism. The slide core is moved with respect to the movable mold. The molded article is thus released from the slide core. Subsequently, in the slide core moving step, the ejector member and the slide core are moved via the cam mechanism in the direction away from the molded article. In the movable mold releasing step, the molded article is then released from the movable mold. The molded article can thus be removed.

As described above, according to the present disclosure, the cam mechanism allows the ejector member to move relative to the slide core as the slide core moves, or allows the ejector member to move with the slide core. Therefore, the present disclosure requires only a hydraulic cylinder for moving the slide core. The present disclosure does not require a dedicated hydraulic cylinder for the ejector member in order to move the ejector member. It is therefore possible to reduce the number of parts of the die casting device. The molded article is made of, for example, metal such as an aluminum alloy or a magnesium alloy. However, the material of the molded article is not limited to metals, and may be resin, fiber-reinforced plastic (FRP), etc.

In the molding method according to the above aspect of the present disclosure, the ejector member may be locked to the movable mold via the cam mechanism in the slide core releasing step, and the ejector member may be unlocked from the movable mold via the cam mechanism in the slide core moving step.

In the molding method with the above configuration, the ejector member is locked to the movable mold via the cam mechanism in the slide core releasing step. The ejector member is thus allowed to move relative to the slide core. The ejector member is unlocked from the movable mold via the cam mechanism in the slide core moving step. The ejector member is thus allowed to move with the slide core. As described above, the die casting device and molding method according to the present disclosure can reduce the number of parts.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a die casting device according to an embodiment of the present disclosure will be described with reference to the drawings.

Configuration of Die Casting Device

First, the configuration of the die casting device according to the present embodiment will be described.

Figures 1A, 1B, 1C:
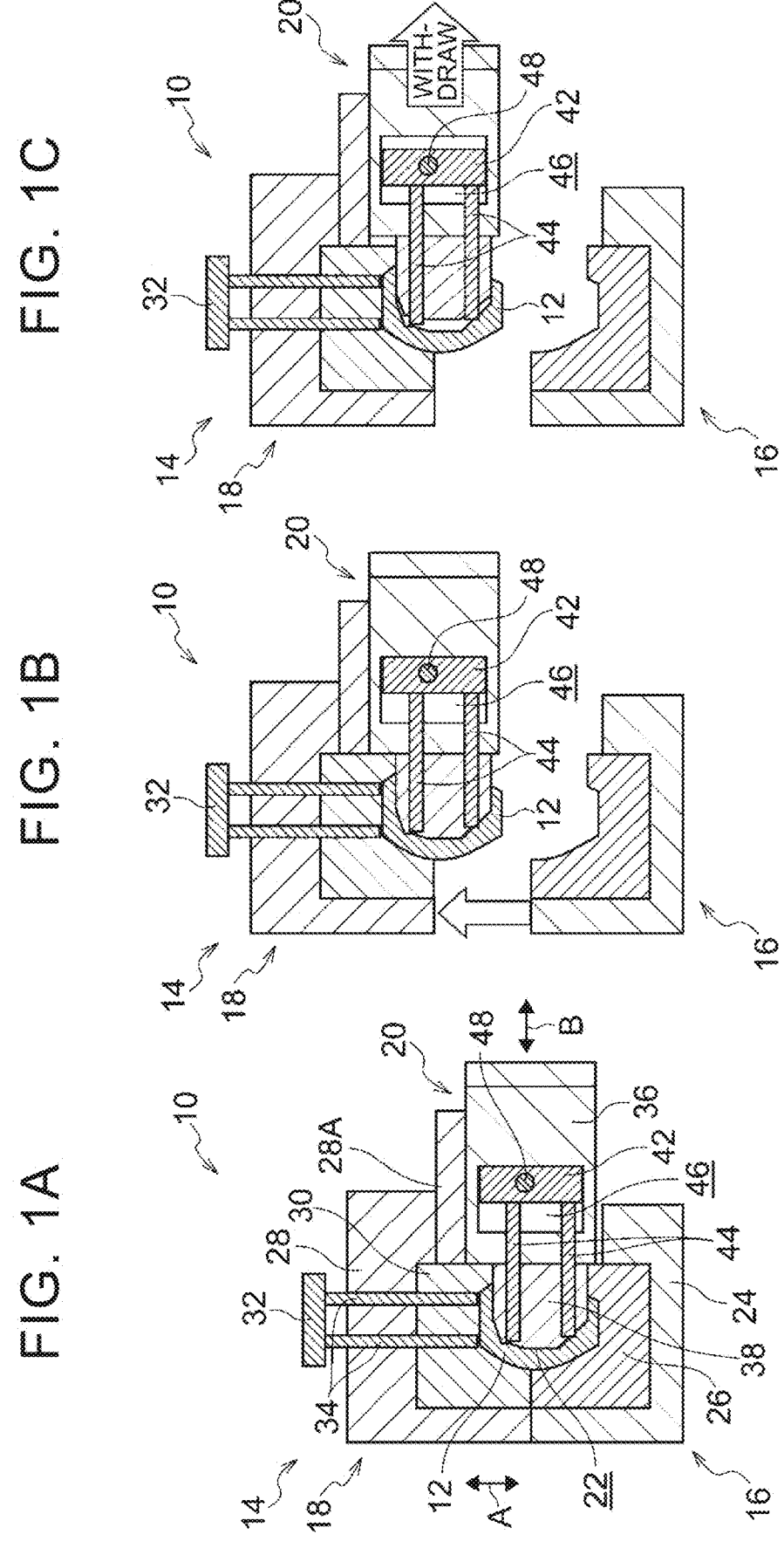
FIG. 1A is a sectional view of a mold used in a die casting device according to an embodiment of the present disclosure as viewed from the side, illustrating a mold clamping step and a molding step.
FIG. 1B is a sectional view of the mold used in the die casting device according to the embodiment of the present disclosure as viewed from the side, illustrating a mold opening step.
FIG. 1C is a sectional view of the mold used in the die casting device according to the embodiment of the present disclosure as viewed from the side, illustrating a slide core releasing step.

FIG. 1A is a sectional view of a die casting device 10 according to an embodiment as viewed from the side. The die casting device 10 shown in FIG. 1A is a device for forming a molded article 12 made of, for example, metal such as an aluminum alloy or a magnesium alloy. The die casting device 10 is provided with a mold 14 for molding the molded article 12.

Here, FIG. 1A shows that the mold 14 is clamped. The mold 14 includes a fixed mold 16 and a movable mold 18. A slide core 20 is provided on the movable mold 18. The slide core 20 is movable along a direction (arrow B direction) crossing the moving direction (arrow A direction) of the movable mold 18.

In the present embodiment, when the mold 14 is clamped, the cavity 22 is formed by the fixed mold 16, the movable mold 18, and the slide core 20. Note that, strictly speaking, the cavity 22 is formed by a fixed insert 26, a movable insert 30, and a slide insert 38, which will be described later. Then, the molded article 12 is formed by filling the cavity 22 with a molten material and cooling the molten material.

As shown in FIG. 1A, the fixed mold 16 includes a fixed main mold 24 and a fixed insert 26. The fixed main mold 24 is provided on the outside of the mold 14. The fixed insert 26 is provided inside the fixed main mold 24. The movable mold 18 includes a movable main mold 28 and a movable insert 30. The movable main mold 28 is provided on the outside of the mold 14. The movable insert 30 is provided inside the movable main mold 28.

The movable mold 18 is movable in contact with and away from the fixed mold 16 along the arrow A direction. Further, a movable ejector plate 32 is provided in the movable mold 18. The movable ejector plate 32 is provided outside the movable mold 18. The movable ejector plate 32 is provided with a plurality of movable ejector pins 34. These movable ejector pins 34 pass through the movable main mold 28 and the movable insert 30, and are able to abut against the surface of the molded article 12.

The movable ejector plate 32 and the movable ejector pins 34 are movable with respect to the movable main mold 28 and the movable insert 30. The movable ejector pins 34 push the surface of the molded article 12 and protrudes from the surface of the movable insert 30, so that the molded article 12 can be released from the movable insert 30.

On the other hand, the slide core 20 includes a slide holder 36 and a slide insert 38. The slide holder 36 is provided on the outside of the mold 14. The slide insert 38 is provided at a distal end portion of the slide holder 36. The slide holder 36 is movable with respect to the movable mold 18. On the outer side of the slide holder 36, a protruding portion 28A formed with a part of the movable main mold 28 protruding is provided. The outer side of the slide holder 36 is surrounded by the protruding portion 28A.

Further, a slide ejector plate 42 is provided in the slide core 20 (described later). The slide ejector plate 42 is provided with a plurality of slide ejector pins 44. These slide ejector pins 44 pass through the slide holder 36 and the slide insert 38 and are able to abut against the surface of the molded article 12.

The slide ejector plate 42 and the slide ejector pins 44 are movable with respect to the slide holder 36 and the slide insert 38. The slide ejector pins 44 pushes the surface of the molded article 12 and protrudes from the surface of the slide insert 38, thereby allowing the molded article 12 to be released from the slide insert 38.

Figures 3A, 3B:
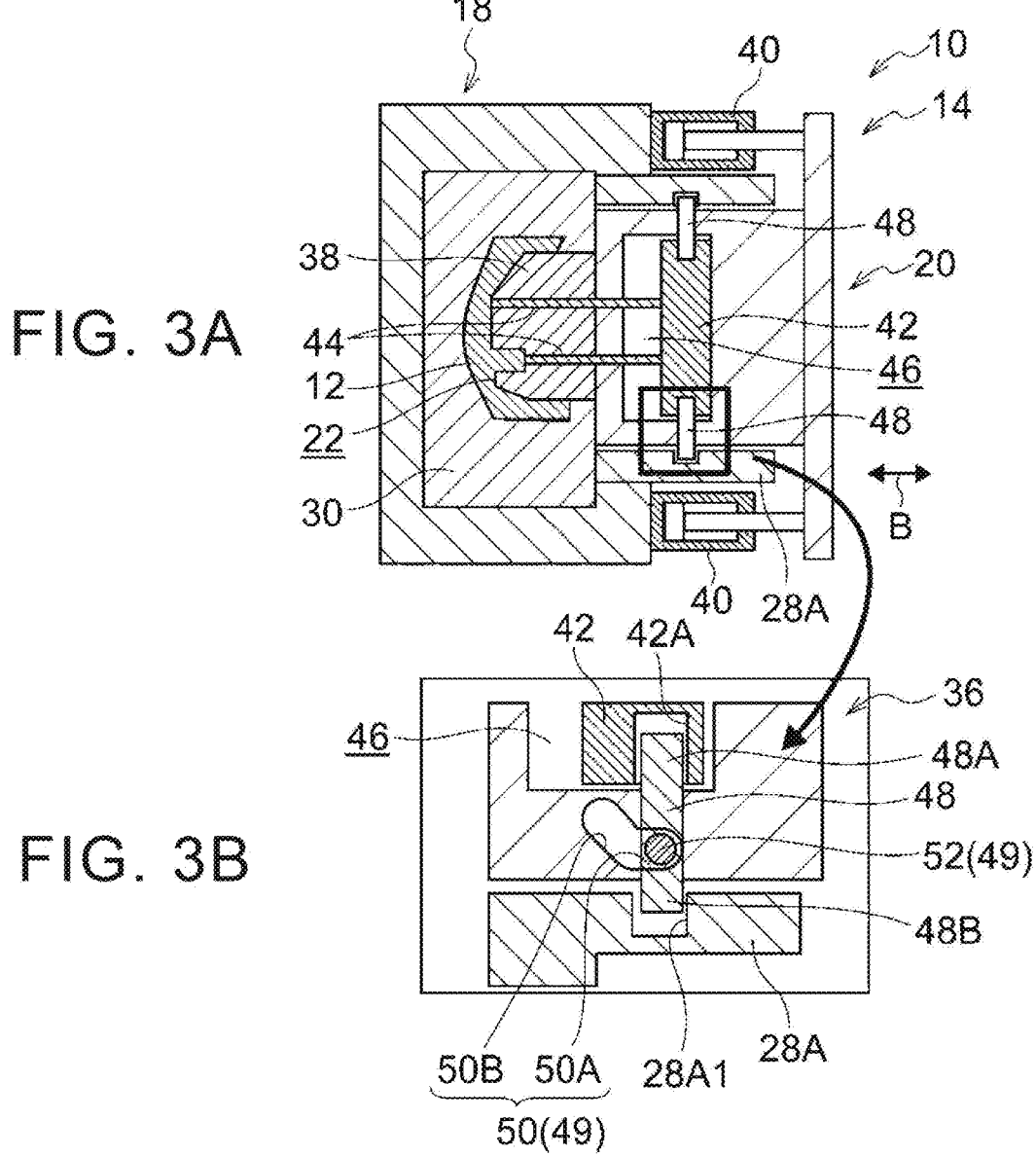
FIG. 3A is a sectional view of the mold used in the die casting device according to the embodiment as viewed in a plane direction corresponding to FIG. 1A.
FIG. 3B is an enlarged view of a main part of FIG. 3A.

FIG. 3A shows a sectional view as viewed in a plane direction corresponding to FIG. 1A. In FIG. 3B, an enlarged view of a main part of FIG. 3A is shown. As shown in FIGS. 3A and 3B, in the present embodiment, the slide holder 36 (the slide core 20) is movable with respect to the movable mold 18 via, for example, the hydraulic cylinder 40. An accommodating portion 46 is provided in the slide holder 36. A slide ejector plate 42 can be accommodated in the accommodating portion 46. In the accommodating portion 46, the slide ejector plate 42 is movable along the arrow B direction.

As shown in FIG. 1A and FIGS. 3A and 3B, engaging recessed portions 42A are formed at both ends in the vertical direction of the central portion of the slide ejector plate 42 and in the longitudinal direction of the slide ejector plate 42. Here, the longitudinal direction of the slide ejector plate 42 is described as a horizontal direction, but the longitudinal direction of the slide ejector plate 42 may be a vertical direction.

One longitudinal end 48A of a cylindrical lock pin 48 is engaged in the engaging recessed portion 42A, for example. Such lock pin 48 is through the slide holder 36. An engaged recessed portion (engaged portion) 28A1 is formed on the protruding portion 28A of the movable main mold 28 provided on the outer side of the slide holder 36. The other end 48B in the longitudinal direction of the lock pin 48 is engaged with the engaged recessed portion 28A1.

The shape of the lock pin 48 is not limited to a cylindrical shape, and may be a prismatic shape. When the shape of the lock pin 48 is a prism shape, the contact area can be increased more than the cylindrical shape. Therefore, the sectional shape may be changed at the engagement portion of the lock pin 48.

On the other hand, in the slide holder 36, a cam slot 50 constituting a part of the cam mechanism 49 is formed at a position opposed to the engaging recessed portion 42A formed in the slide ejector plate 42. The cam slot 50 includes a parallel portion 50A and a tilted portion 50B. The parallel portion 50A is formed so as to be substantially parallel to the moving direction of the slide ejector plate 42. The tilted portion 50B is provided closer to the slide insert 38 than the parallel portion 50A, and is tilted so that its end closest to the parallel portion 50A is located closest to the protruding portion 28A of the movable main mold 28 (farthest from the slide ejector plate 42) and its end farthest from the parallel portion 50A is located farthest from the protruding portion 28A of the movable main mold 28 (closest to the slide ejector plate 42).

A cam roller (tracing portion) 52 provided in the lock pin 48 and forming another part of the cam mechanism 49 is insertable into the cam slot 50, and is movable along the shape of the cam slot 50. The lock pin 48 is movable in the slide holder 36 through the cam roller 52.

As shown in FIGS. 3A and 3B, when the cam roller 52 is disposed on the parallel portion 50A of the cam slot 50, the one end 48A of the lock pin 48 is engaged with the engaging recessed portion 42A of the slide ejector plate 42. The other end 48B of the lock pin 48 is engaged with an engaged recessed portion 28A1 formed on the protruding portion 28A of the movable main mold 28 (locked). As a result, the movement of the slide ejector plate 42 is restricted.

Figure 4A:
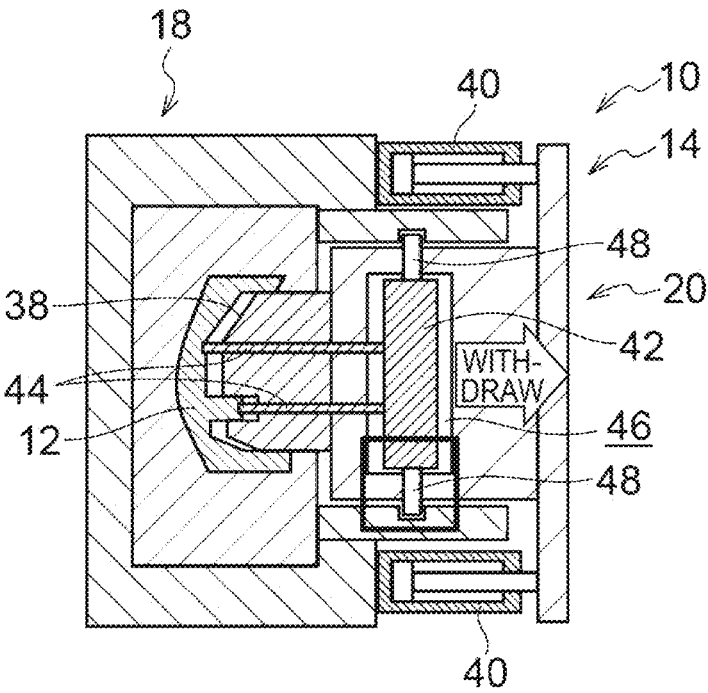
FIG. 4A is a sectional view of the mold used in the die casting device according to the embodiment of the present disclosure as viewed in a plane direction corresponding to FIG. 1C.
Figure 4B:
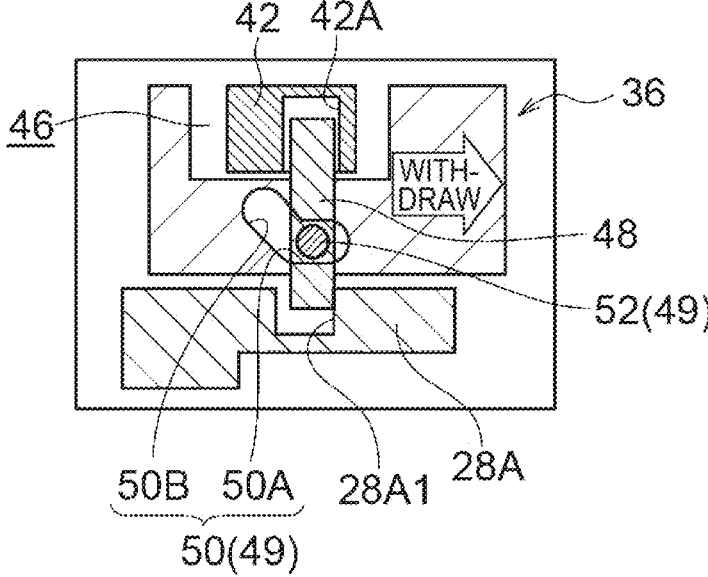
FIG. 4B is an enlarged view of a main part of FIG. 4A.

In this condition, as shown in FIGS. 4A and 4B, when the slide holder 36 (the slide core 20) moves (retracts), the slide ejector plate 42 moves relatively to the slide holder 36 because the movement is restricted. Further, the movement of the slide holder 36 causes the cam roller 52 to move along the cam slot 50 of the cam slot 50. In this situation, a gap is provided between the one end 48A of the lock pin 48 and the engaging recessed portion 42A of the slide ejector plate 42.

Figure 5A:
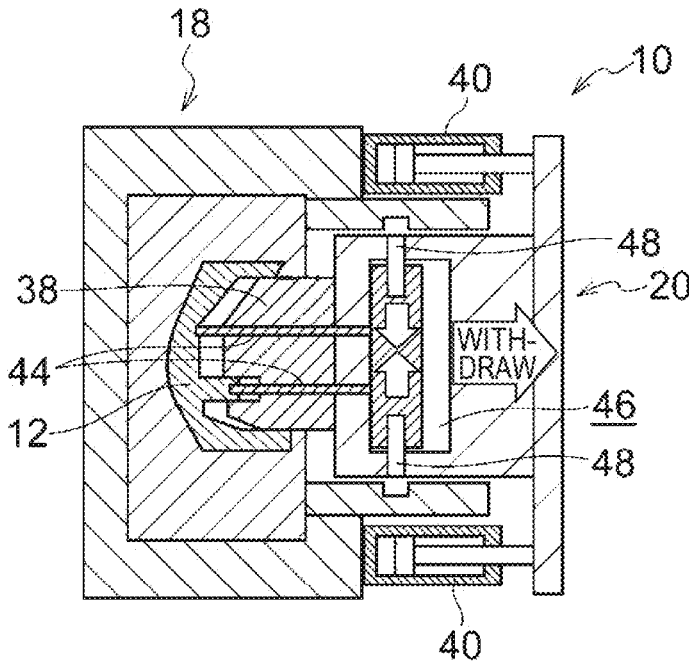
FIG. 5A is a sectional view of the mold used in the die casting device according to the embodiment as viewed in a plane direction corresponding to FIG. 2A.
Figure 5B:
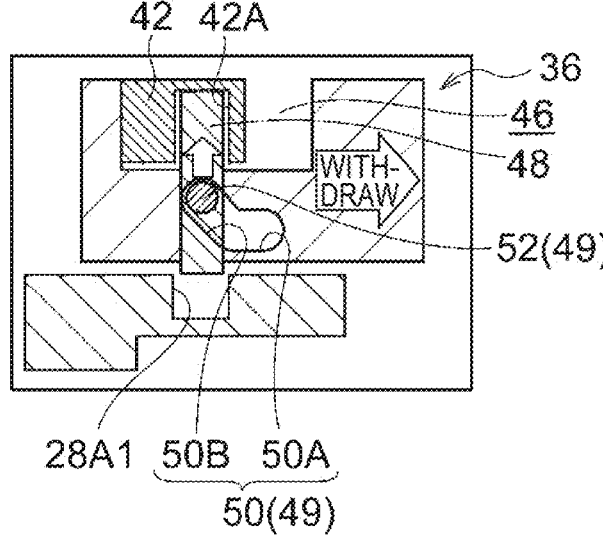
FIG. 5B is an enlarged view of a main part of FIG. 5A.

On the other hand, as shown in FIGS. 5A and 5B, when the cam roller 52 is disposed on the tilted portion 50B of the cam slot 50, the cam roller 52 moves toward the accommodation portion 46 as the slide holder 36 is retracted. Therefore, the one end 48A of the lock pin 48 further moves to the back of the engaging recessed portion 42A of the slide ejector plate 42 via the cam roller 52.

Figure 6A:
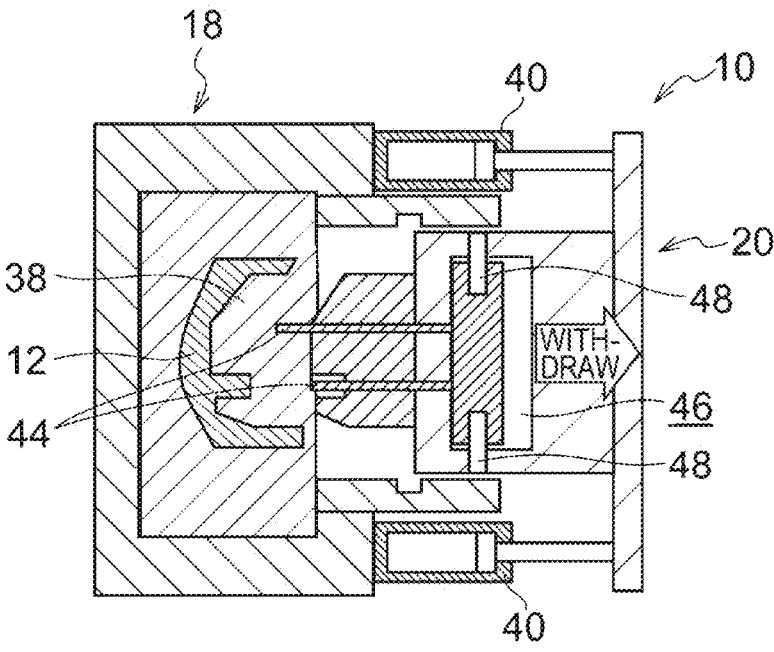
FIG. 6A is a sectional view of the mold used in the die casting device according to the embodiment as viewed from a plane direction corresponding to FIG. 2B.
Figure 6B:
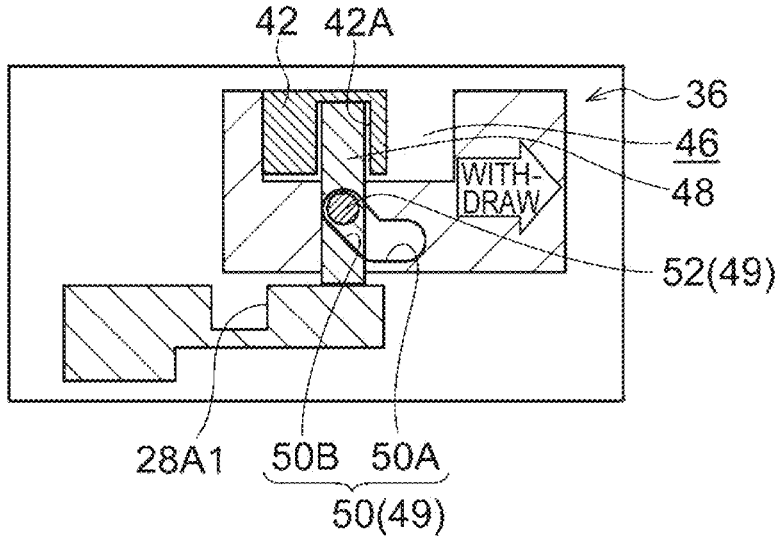
FIG. 6B is an enlarged view of a main part of FIG. 6A.

As a result, the other end 48B of the lock pin 48 is disengaged from the engaged recessed portion 28A1 of the movable main mold 28 (unlocked state). Therefore, as shown in FIGS. 6A and 6B, the slide ejector plate 42 can be moved with the slide holder 36 (the slide core 20).

Operation and Effects of the Die Casting Device

Next, the operation and effects of the die casting device according to the present embodiment will be described.

As shown in FIG. 1A and FIGS. 3A and 3B, the die casting device 10 according to the present embodiment includes a fixed mold 16, a movable mold 18, a slide core 20, and a cam mechanism 49. In the present embodiment, the slide core 20 is provided on the movable mold 18. The cavity 22 is formed by the fixed mold 16, the movable mold 18, and the slide core 20. A molded article 12 is molded in the cavity 22.

The slide core 20 is movable along a direction (arrow B direction) crossing the moving direction of the movable mold 18. The cam mechanism 49 allows the slide ejector plate 42 and slide ejector pins 44 that release the molded article 12 from the slide core 20 to move relative to the slide core 20 as the slide core 20 moves. Alternatively, a cam mechanism 49 allows the slide ejector plate 42 to move with the slide core 20.

Here, a molding method using the die casting device 10 according to the present embodiment will be described.

Figures 2A, 2B, 2C:
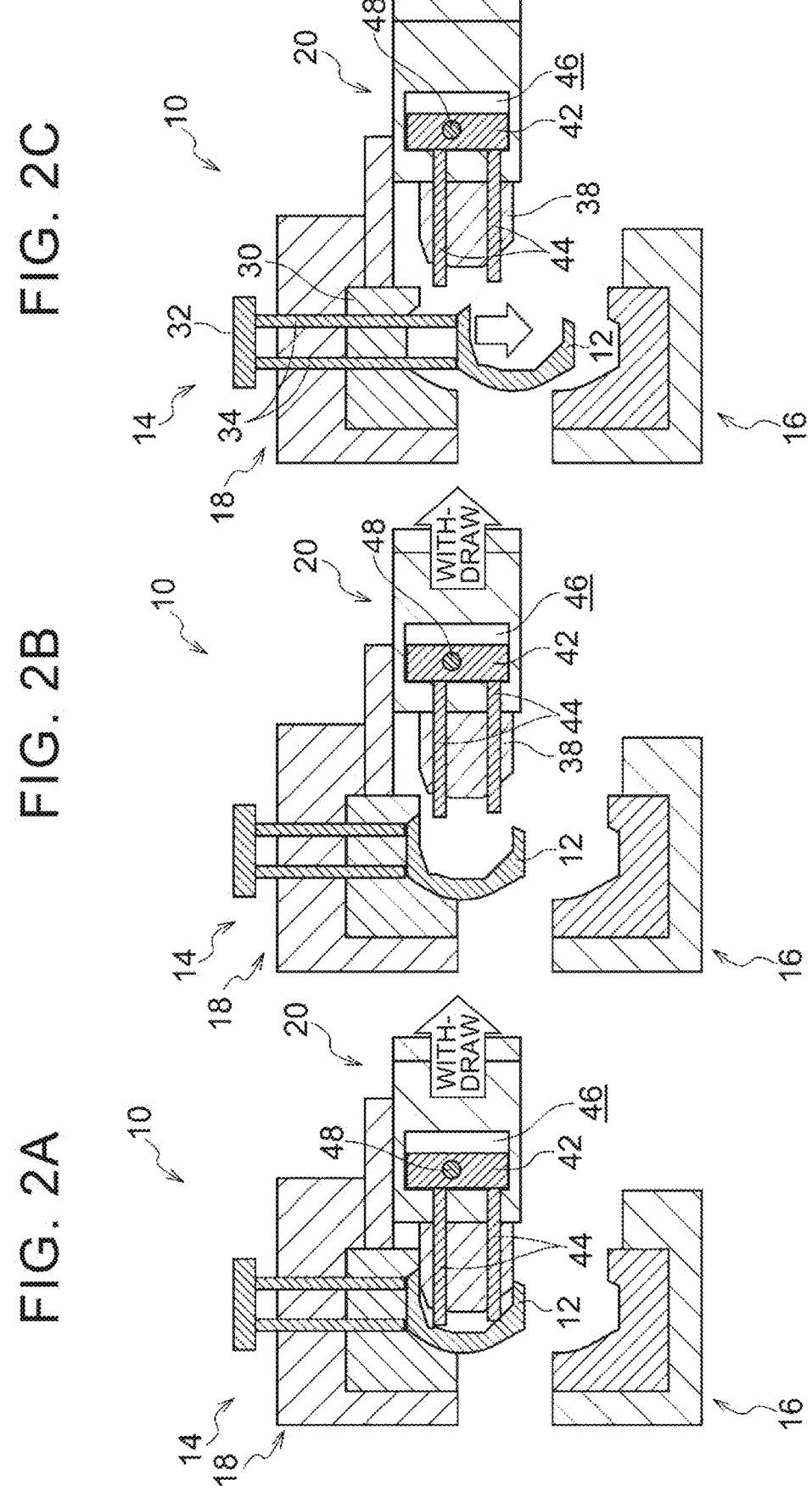
FIG. 2A is a sectional view of the mold used in the die casting device according to the embodiment as viewed from the side, illustrating a slide core moving step.
FIG. 2B is a sectional view of the mold used in the die casting device according to the embodiment as viewed from the side, illustrating the slide core moving step.
FIG. 2C is a sectional view of the mold used in the die casting device according to the embodiment as viewed from the side, illustrating a movable mold releasing step.

The molding method according to the present embodiment includes a mold clamping step, a molding step, a mold opening step, a slide core releasing step, a slide core moving step, and a movable mold releasing step. FIG. 1A and FIGS. 3A and 3B show a mold clamping step and a molding step of the mold 14, and FIG. 1B shows a mold opening step of the mold 14. FIGS. 1C, 4A, and 4B show a slide core releasing step. FIGS. 2A, 5A, 5B, 2B, 6A, and 6B show the slide core moving step. FIG. 2C shows a movable mold releasing step.

As shown in FIG. 1A and FIGS. 3A and 3B, in the mold clamping step of the mold 14, the movable mold 18 is brought into contact with the fixed mold 16. In the present embodiment, the cavity 22 is formed by the fixed insert 26 provided in the fixed mold 16, the movable insert 30 provided in the movable mold 18, and the slide insert 38 provided in the slide core 20. Then, in the molding step, the molded article 12 is formed by filling the cavity 22 with a molten material and cooling the molten material.

Here, the slide ejector plate 42 is locked to the movable main mold 28 via the cam mechanism 49. That is, the cam roller 52 is disposed on the parallel portion 50A of the cam slot 50. The other end 48B of the lock pin 48 is engaged with the engaged recessed portion 28A1 of the movable main mold 28. Movement of the slide ejector plate 42 is restricted.

Next, as shown in FIG. 1B, in the mold opening step of opening the mold 14, the movable mold 18 and the slide core 20 are moved together in a direction away from the fixed mold 16. At this time, the molded article 12 is released from the fixed insert 26.

Then, as shown in FIGS. 1C, 4A, and 4B, in the slide core releasing step, the slide holder 36 is retracted. Here, as described above, the slide ejector plate 42 is locked to the movable main mold 28 via the cam mechanism 49. Accordingly, when the slide holder 36 is retracted, the slide ejector plate 42 moves relative to the slide holder 36 (the slide core 20). Therefore, when the slide holder 36 moves, the slide ejector pins 44 protrudes from the surface of the slide insert 38. Thus, the molded article 12 can be released from the slide insert 38.

As described above, in the present embodiment, the slide ejector plate 42 moves relative to the slide holder 36, so that the ejector operation by the slide ejector pins 44 can be performed in a state completely synchronized with the retraction amount of the slide holder 36. Thus, the molded article 12 can be gradually released from the slide insert 38 by the slide ejector pins 44 while the molded article 12 is held by the slide insert 38. Deformation of the molded article 12 is reduced.

Further, as a comparative example, although not shown, when the slide ejector plate is pushed forward by another hydraulic cylinder while the slide holder is retracted by the hydraulic cylinder, when oil is supplied from one oil system (pump) to a plurality of cylinders, the cylinder with low resistance moves first. Therefore, when the dedicated cylinder for the slide ejector plate is delayed in its movement due to the retraction of the slide holder, the slide ejector pins do not function. Therefore, in the comparative example, it is necessary to provide a distribution valve such as dividing the hydraulic pump.

On the other hand, in the present embodiment, the slide ejector pins 44 can be moved relatively as the slide holder 36 moves. A hydraulic cylinder 40 for moving the slide holder 36 is sufficient, and a dedicated hydraulic cylinder for the slide ejector plate 42 is not required. Therefore, in the present embodiment, it is not necessary to divide the hydraulic pump or provide a distribution valve. The present embodiment is not affected by hydraulic pressure fluctuations such as a decrease in hydraulic pressure.

Next, as shown in FIGS. 2A, 5A, and 5B, in the slide core moving step, the slide ejector plate 42 is unlocked from the movable main mold 28 via the cam mechanism 49. That is, the cam roller 52 is disposed on the tilted portion 50B of the cam slot 50. The other end 48B of the lock pin 48 is disengaged from the engaged recessed portion 28A1 of the movable main mold 28. The slide ejector plate 42 is movable with the slide core 20. Then, as shown in the FIGS. 2B, 6A, and 6B, the slide ejector pins 44 are retracted (moved) with the slide core 20 from the movement trajectory of the molded article 12.

Next, as shown in FIG. 2C, in the movable mold releasing step, the movable ejector pins 34 moves with respect to the movable main mold 28 and the movable insert 30, and protrudes from the front face of the movable insert 30. As a result, the molded article 12 can be released from the movable insert 30. It is possible to take out the molded article 12.

As described above, in the present embodiment, the cam mechanism 49 allows the slide ejector plate 42 and the slide ejector pins 44 to move relative to the slide core 20 as the slide holder 36 (the slide core 20) moves. Alternatively, the cam mechanism 49 can move the slide ejector plate 42 and the slide ejector pins 44 with the slide core 20. That is, in the present embodiment, a dedicated hydraulic cylinder for moving the slide ejector plate 42 and the slide ejector pins 44 is not required. It is therefore possible to reduce the number of parts of the die casting device 10.

In the present embodiment, the cam mechanism 49 includes the cam slot 50 and the lock pin 48. The cam slot 50 is provided in the slide core 20. The lock pin 48 is provided with a cam roller 52. The cam roller 52 is inserted into the cam slot 50. The lock pin 48 moves along the shape of the cam slot 50 via the cam roller 52.

The lock pin 48 is engaged with an engaging recessed portion 42A provided on the slide ejector plate 42 side, and is engageable with an engaged recessed portion 28A1 provided on the movable mold 18 side. When the lock pin 48 is engaged with the engaged recessed portion 28A1, the slide ejector plate 42 is fixed to the movable mold 18 through the lock pin 48. In this state, when the slide core 20 slides, the slide ejector plate 42 is movable relative to the slide core 20. This makes it possible to release the molded article 12 from the slide core 20.

As described above, with the simple configuration, the slide ejector plate 42 can be moved relative to the slide core 20 as the slide core 20 moves, or the slide ejector plate 42 can be moved with the slide core 20. In the present embodiment, this configuration can be implemented at low cost.

In the present embodiment, by using the cam mechanism 49, the slide ejector plate 42 and the slide ejector pins 44 are allowed to move relative to the slide core as the slide core 20 moves, or the slide ejector plate 42 is allowed to move with the slide core 20. The cam mechanism 49 is not limited as long as such an action can be obtained. For example, the movement path of the lock pin 48 may be changed, such as the cam slot 50 is changed in shape.

Although an embodiment of the present disclosure has been described above, the present disclosure is not limited to such an embodiment. One embodiment and various modifications may be used in combination as appropriate. Various embodiments may be made without departing from the spirit of the present disclosure.

Additional Remarks

Note that the vehicle lower structure according to the present disclosure may be formed by appropriately combining the following configurations.

Configuration 1

A die casting device includes:
a fixed mold that is a part of a mold;
a movable mold that is another part of the mold, that is configured to be brought into contact with and separated from the fixed mold, and that together with the fixed mold forms a cavity when the movable mold is brought into contact with the fixed mold to allow a molded article to be formed in the cavity;
a slide core that is provided on the movable mold, that is movable in a direction intersecting with a direction in which the movable mold is moved, and that together with the fixed mold and the movable mold forms the molded article; and
a cam mechanism that allows an ejector member to move relative to the slide core as the slide core moves or that allows the ejector member to move with the slide core, the ejector member being configured to release the molded article from the slide core.

Configuration 2

The cam mechanism includes
a cam slot provided in the slide core, and
a lock pin that is movable via a tracing portion inserted in the cam slot, that is engaged with the ejector member and is engageable with an engaged portion of the movable mold, and that allows the ejector member to move relative to the slide core when engaged with the engaged portion, and allows the ejector member to move with the slide core when disengaged from the engaged portion.

Configuration 3

A molding method using the die casting device includes:
a mold clamping step of bringing the movable mold into contact with the fixed mold;
a molding step of forming a molded article by filling the cavity with a molten material and cooling the molten material;
a mold opening step of moving the movable mold and the slide core in a direction away from the fixed mold;
a slide core releasing step of allowing the ejector member to move relative to the slide core via the cam mechanism and moving the slide core with respect to the movable mold to release the molded article from the slide core;
a slide core moving step of moving the ejector member with the slide core via the cam mechanism in a direction away from the molded article; and
a movable mold releasing step of releasing the molded article from the movable mold.

Configuration 4

The ejector member is locked to the movable mold via the cam mechanism in the slide core releasing step, and
the ejector member is unlocked from the movable mold via the cam mechanism in the slide core moving step.

What is claimed is:

1. A die casting device, comprising:
a fixed mold that is a part of a mold;
a movable mold that is another part of the mold, that is configured to be brought into contact with and separated from the fixed mold, and that together with the fixed mold forms a cavity when the movable mold is brought into contact with the fixed mold to allow a molded article to be formed in the cavity;
a slide core that is provided on the movable mold, that is movable in a direction intersecting with a direction in which the movable mold is moved, and that together with the fixed mold and the movable mold forms the molded article; and
a cam mechanism that allows an ejector member to move relative to the slide core as the slide core moves or that allows the ejector member to move with the slide core, the ejector member being configured to release the molded article from the slide core, wherein the cam mechanism includes
a cam slot provided in the slide core, and
a lock pin that is movable via a tracing portion inserted in the cam slot, that is engaged with the ejector member and is engageable with an engaged portion of the movable mold, and that allows the ejector member to move relative to the slide core when engaged with the engaged portion, and allows the ejector member to move with the slide core when disengaged from the engaged portion.

2. A molding method using the die casting device according to claim 1, the molding method comprising:
bringing the movable mold into contact with the fixed mold;

forming a molded article by filling the cavity with a molten material and cooling the molten material;

moving the movable mold and the slide core in a direction away from the fixed mold;

allowing the ejector member to move relative to the slide core via the cam mechanism and moving the slide core with respect to the movable mold to release the molded article from the slide core;

moving the ejector member with the slide core via the cam mechanism in a direction away from the molded article; and releasing the molded article from the movable mold.

3. The molding method according to claim 2, wherein:

the ejector member is locked to the movable mold via the cam mechanism during allowing the ejector member to move relative to the slide core via the cam mechanism and moving the slide core with respect to the movable mold to release the molded article from the slide core; and the ejector member is unlocked from the movable mold via the cam mechanism during moving the ejector member with the slide core via the cam mechanism in the direction away from the molded article.

* * * * *